(12) United States Patent
Tsukasaki

(10) Patent No.: US 11,052,916 B2
(45) Date of Patent: Jul. 6, 2021

(54) CONVEYANCE AMOUNT CONTROLLING APPARATUS

(71) Applicant: SUBARU CORPORATION, Tokyo (JP)

(72) Inventor: Yuichiro Tsukasaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 25 days.

(21) Appl. No.: 16/036,280

(22) Filed: Jul. 16, 2018

(65) Prior Publication Data

US 2019/0092338 A1 Mar. 28, 2019

(30) Foreign Application Priority Data

Sep. 22, 2017 (JP) .............................. JP2017-182727

(51) Int. Cl.
*B60W 50/00* (2006.01)
*B62D 6/00* (2006.01)
(Continued)

(52) U.S. Cl.
CPC ..... *B60W 50/0098* (2013.01); *B60G 17/0165* (2013.01); *B60G 17/0195* (2013.01);
(Continued)

(58) Field of Classification Search
CPC ........ B60W 50/0098; B60W 2050/143; B60W 50/14; B60W 40/06; B60W 10/22; B60W 10/20; B60W 50/16; B60W 2552/35; B60W 60/005–0061; B62D 15/029; B62D 6/00; B62D 5/0472; B62D 6/008; B62D 15/025;
(Continued)

(56) References Cited

U.S. PATENT DOCUMENTS 7,272,474 B1* 9/2007 Stentz ..................... G01C 7/04
701/26
2017/0136842 A1* 5/2017 Anderson .............. B60N 2/501
(Continued)

FOREIGN PATENT DOCUMENTS

JP 2016-43747 A 4/2016

*Primary Examiner* — Jeffrey C Boomer
*Assistant Examiner* — Annmarie Irwin
(74) *Attorney, Agent, or Firm* — Troutman Pepper Hamilton Sanders LLP

(57) ABSTRACT

A conveyance amount controlling apparatus includes a control state detector, a road surface state detector, and at least one conveyance amount controller including a conveyance device conveying, to a driver, information representing a road surface state and a conveyance amount controlling device controlling a vibration conveyance amount as a conveyance amount of a vibration caused by a road surface irregularity. A second conveyance amount, as the vibration conveyance amount obtained when a road surface state amount less than a first threshold is detected by the road surface state detector, is less than a first conveyance amount, as the vibration conveyance amount obtained when execution of an automatic driving control is not detected by the control state detector. A third conveyance amount, as the vibration conveyance amount obtained when the road surface state amount equal to or greater than the first threshold is detected, is greater than the second conveyance amount.

17 Claims, 6 Drawing Sheets

(51) Int. Cl.

| | |
|---|---|
| *B62D 15/02* | (2006.01) |
| *B60G 17/0195* | (2006.01) |
| *B60W 50/16* | (2020.01) |
| *B60W 50/14* | (2020.01) |
| *B60W 40/06* | (2012.01) |
| *B60G 17/0165* | (2006.01) |
| *B62D 5/04* | (2006.01) |

(52) U.S. Cl.
CPC ............ *B60W 40/06* (2013.01); *B60W 50/14* (2013.01); *B60W 50/16* (2013.01); *B62D 5/0472* (2013.01); *B62D 6/00* (2013.01); *B62D 6/008* (2013.01); *B62D 15/025* (2013.01); *B62D 15/029* (2013.01); *B60G 2400/821* (2013.01); *B60W 2050/143* (2013.01); *B60W 2552/35* (2020.02)

(58) Field of Classification Search
CPC .......... B60G 17/0165; B60G 2400/821; B60G 17/0195
See application file for complete search history.

(56) References Cited

U.S. PATENT DOCUMENTS

| | | | |
|---|---|---|---|
| 2017/0235315 A1 | 8/2017 | Nakaya et al. | |
| 2018/0079272 A1* | 3/2018 | Aikin | G05D 1/0088 |
| 2019/0202494 A1* | 7/2019 | Itou | B60W 40/08 |

* cited by examiner

CONVEYANCE AMOUNT CONTROLLING APPARATUS

CROSS-REFERENCE TO RELATED APPLICATIONS

The present application claims priority from Japanese Patent Application No. 2017-182727 filed on Sep. 22, 2017, the entire contents of which are hereby incorporated by reference.

BACKGROUND

The technology relates to a conveyance amount controlling apparatus that controls an amount of information, representing a state of a road surface, to be conveyed to a driver.

In general, in order to mitigate a vibration caused by an irregularity on a road surface, a vehicle such as an automobile absorbs the vibration by means of a suspension, or suppresses a vibration of a steering wheel by means of an electric power steering (EPS) motor. The vehicle also controls vibration absorbing characteristics of the suspension or controls the EPS motor to allow the vibration caused by the irregularity to be conveyed to some extent to a driver. This enables the driver to understand a state of the road surface, which in turn contributes to safety improvement.

A necessity of conveying the vibration to the driver decreases during execution of an automatic driving control which causes the vehicle to travel automatically along a target course and techniques of which have been developed in recent years. In addition, the driver may possibly feel unpleasant if a vibration to be felt by the driver increases more than necessary during the execution of the automatic driving control.

Japanese Unexamined Patent Application Publication No. 2016-43747 discloses a technique that improves a ride quality by so controlling a suspension as to allow an impact to be absorbed easily when an automatic driving mode is started.

SUMMARY

An aspect of the technology provides a conveyance amount controlling apparatus that includes: a control state detector configured to detect a state of execution of an automatic driving control, in which the automatic driving control controls a vehicle to travel automatically along a target course; a road surface state detector configured to detect a state of a road surface on which the vehicle travels; and at least one conveyance amount controller configured to control an amount of information, representing the state of the road surface, to be conveyed to a driver of the vehicle. The road surface state detector is configured to detect, when the execution of the automatic driving control is detected by the control state detector, a road surface state amount that has a correspondence relationship with an irregularity of the road surface. The at least one conveyance amount controller includes: a conveyance device configured to convey, to the driver, the information representing the state of the road surface; and a conveyance amount controlling device configured to control, as the amount of the information to be conveyed to the driver, a vibration conveyance amount on a basis of a result of the detection performed by the control state detector and a result of the detection performed by the road surface state detector. The vibration conveyance amount is an amount of conveyance of a vibration caused by the irregularity of the road surface. A second conveyance amount is less than a first conveyance amount and a third conveyance amount is greater than the second conveyance amount, where: the vibration conveyance amount, obtained when the execution of the automatic driving control is not detected, is the first conveyance amount; the vibration conveyance amount, obtained when the road surface state amount that is less than a first threshold is detected, is the second conveyance amount; and the vibration conveyance amount, obtained when the road surface state amount that is equal to or greater than the first threshold is detected, is the third conveyance amount.

An aspect of the technology provides a conveyance amount controlling apparatus that includes: circuitry configured to detect a state of execution of an automatic driving control, in which the automatic driving control controls a vehicle to travel automatically along a target course; a road surface state detector configured to detect a state of a road surface on which the vehicle travels; and at least one conveyance amount controller configured to control an amount of information, representing the state of the road surface, to be conveyed to a driver of the vehicle. The road surface state detector is configured to detect, when the execution of the automatic driving control is detected by the circuitry, a road surface state amount that has a correspondence relationship with an irregularity of the road surface. The at least one conveyance amount controller includes: a conveyance device configured to convey, to the driver, the information representing the state of the road surface; and a conveyance amount controlling device configured to control, as the amount of the information to be conveyed to the driver, a vibration conveyance amount on a basis of a result of the detection performed by the circuitry and a result of the detection performed by the road surface state detector. The vibration conveyance amount is an amount of conveyance of a vibration caused by the irregularity of the road surface. A second conveyance amount is less than a first conveyance amount and a third conveyance amount is greater than the second conveyance amount, where: the vibration conveyance amount, obtained when the execution of the automatic driving control is not detected, is the first conveyance amount; the vibration conveyance amount, obtained when the road surface state amount that is less than a first threshold is detected, is the second conveyance amount; and the vibration conveyance amount, obtained when the road surface state amount that is equal to or greater than the first threshold is detected, is the third conveyance amount.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Reducing an amount of vibration to be conveyed to a driver constantly during execution of an automatic driving control may possibly cause the driver to miss deterioration in a state of a road surface, or may possibly lead to a delay in determining discontinuation of automatic driving resulting from the deterioration in the state of the road surface, leaving room for improvement in terms of safety.

It is desirable to provide a conveyance amount controlling apparatus that controls an amount of information, representing a state of a road surface, to be conveyed to a driver and makes it possible to achieve a balance between comfort and safety.

First Implementation

Figure 1:
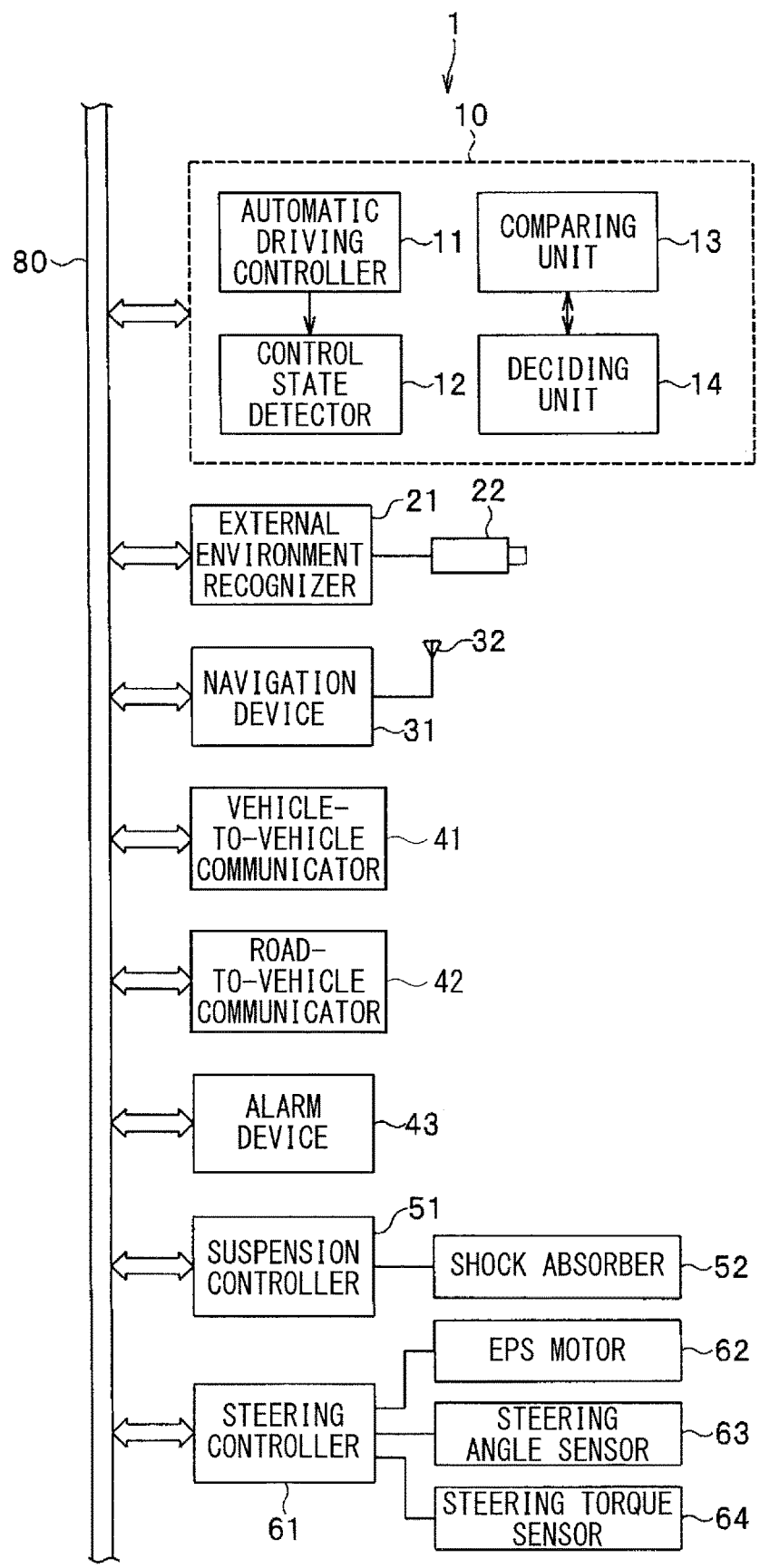
FIG. 1 illustrates an example of a configuration of a traveling control system that includes a conveyance amount controlling apparatus according to one implementation of the technology.

First, with reference to FIG. 1, a description is given of an example of a configuration of a traveling control system that includes a conveyance amount controlling apparatus 1 according to a first implementation of the technology. FIG. 1 describes an example configuration of the traveling control system. Referring to FIG. 1, a traveling control system may include a traveling controller 10, an external environment recognizer 21, a navigation device 31, a vehicle-to-vehicle communicator 41, a road-to-vehicle communicator 42, an alarm device 43, a suspension controller 51, and a steering controller 61. The traveling controller 10, the external environment recognizer 21, the navigation device 31, the vehicle-to-vehicle communicator 41, the road-to-vehicle communicator 42, the alarm device 43, the suspension controller 51, and the steering controller 61 may be coupled to one another via a communication bus 80, which may form an on-vehicle network.

The traveling controller 10 may include an automatic driving controller 11 that executes an automatic driving control under which a vehicle automatically travels along a target course, and a control state detector 12 that detects a state of execution of the automatic driving control. The traveling controller 10 may also be a controller that executes main controls of the vehicle, including the automatic driving control. Non-limiting examples of controls executed by the traveling controller 10 may include: an engine control under which an operational state of an engine in the vehicle is controlled; a brake control under which a brake device for four wheels is controlled; and a steering control under which a later-described electric power steering (EPS) motor 62 is controlled.

The external environment recognizer 21 may have functions of recognizing an external environment of the vehicle. Specific but non-limiting examples of the functions of recognizing the external environment of the vehicle may include: a function of recognizing a state of a road surface on which the vehicle travels; and a function of recognizing presence, a position, motion, and/or any other factor of an object on or around a road. The external environment of the vehicle may be recognized by a sensor coupled to the external environment recognizer 21. In an example implementation, a camera device 22, such as a stereo camera, a monocular camera, or a color camera, may be used as the sensor. In an example implementation where the camera device 22 is used, the external environment recognizer 21 may recognize the external environment by subjecting an image captured by the camera device 22 to image processing, for example. The sensor, however, is not limited to the camera device 22; in an example implementation, a radar device such as millimeter wave radar or LiDAR may be used.

The navigation device 31 may include a receiver 32 and an unillustrated storage. The receiver 32 may receive position information from a positioning satellite, for example, in a global navigation satellite system (GNSS), such as a global positioning system (GPS). The storage may store road map information. On the basis of the position information that the receiver 32 has received from the positioning satellite, the navigation device 31 may acquire vehicle position information that indicates, for example, coordinates such as latitude or longitude. In addition, on the basis of the vehicle position information and the road map information, the navigation device 31 may acquire information regarding road geometries, such as curvatures, lane widths, or shoulder widths of a road on which the vehicle travels.

The vehicle-to-vehicle communicator 41 may perform a wireless communication between the own vehicle and any other vehicle to acquire information such as vehicle information or information on an external environment recognized by an external environment recognizer provided in any other vehicle. The vehicle information may be related to a factor such as a position or a speed of any surrounding vehicle.

The road-to-vehicle communicator 42 may perform a wireless communication between the own vehicle and infrastructure equipment to acquire information such as limit/regulation information or road information. The road information may contain information on a state of the road surface and construction information.

The alarm device 43 may provide the driver with a warning and notification. The alarm device 43 may include a visual output device such as a monitor, a display, or an alarm lamp, and an auditory output device such as a speaker or a buzzer. For example, the alarm device 43 may give a warning to the driver by means of one or both of the visual output device and the auditory output device, when an abnormality occurs in any of various devices provided in the vehicle, or when a situation arises that requires the driver's control during the execution of the automatic driving control.

Figure 2:
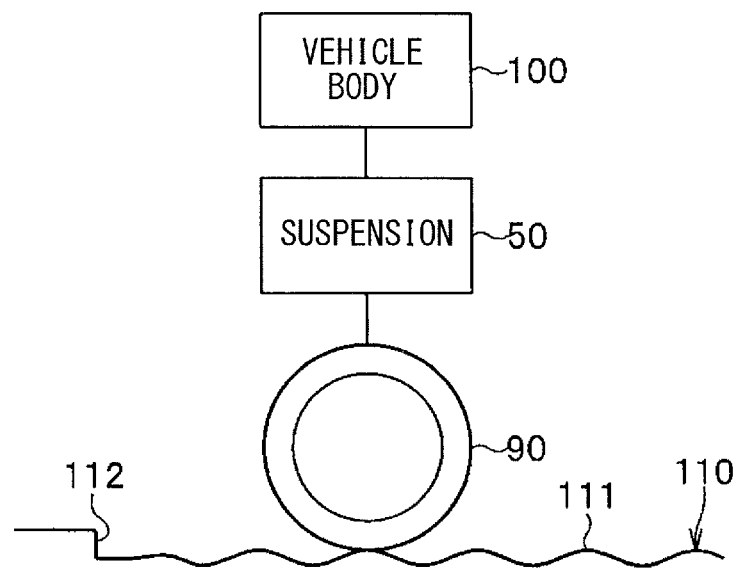
FIG. 2 illustrates an example of a first conveyance amount controller according to one implementation of the technology.

The suspension controller 51 may control various characteristics of a suspension 50 provided in the vehicle. In an example implementation, the suspension 50 may include a shock absorber 52 such as an oil damper or any other vibration absorbing member, and the suspension controller 51 may adjust damping force of the shock absorber 52 to control a vibration absorbing characteristic of the suspension 50. The suspension 50 is illustrated in FIG. 2 to which reference is made later in greater detail.

Figure 3:
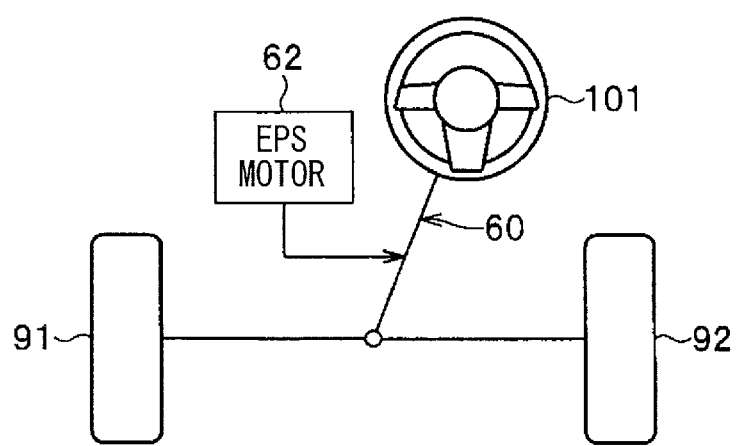
FIG. 3 illustrates an example of a second conveyance amount controller according to one implementation of the technology.

The steering controller 61 may be coupled to a steering torque sensor 64 that detects a steering torque that the driver applies to a steering wheel 101. The steering controller 61 may control the EPS motor 62 provided in a steering system 60 of the vehicle, in accordance with the steering torque detected by the steering torque sensor 64. During the execution of the automatic driving control, the steering controller 61 may control the EPS motor 62 in such a way that the vehicle automatically travels along the target course, on the basis of a steering control signal outputted from the traveling controller 10. In an example implementation, the steering controller 61 may also be coupled to a steering angle sensor 63 that detects a steering angle of the steering wheel 101. The steering system 60 and the steering wheel 101 are illustrated in FIG. 3 to which reference is made later in greater detail.

On the basis of a result of the recognition performed by the external environment recognizer 21 and the pieces of information acquired by the navigation device 31, the vehicle-to-vehicle communicator 41, and the road-to-vehicle communicator 42, the automatic driving controller 11 may execute drive assist controls, such as a collision prevention control for prevention of a contact with an obstacle or any other object, a constant speed traveling control, a follow-up traveling control, a lane keeping control, a lane departure prevention control, or a lane change control. In addition, the automatic driving controller 11 may execute the automatic driving control in which two or more of these controls are executed in collaboration with one another.

The traveling controller 10 may be coupled to an unillustrated switch group used for various settings and operations. The switch group may include: a turn signal switch for use in turning on/off direction indicators; switches for use in enabling/disabling the constant speed traveling control, the follow-up traveling control, the lane keeping control, the lane departure prevention control, and the lane change control; a switch for use in enabling or disabling the automatic driving control in which two or more of the controls are executed in collaboration with one another; and switches for use in setting a vehicle speed, an inter-vehicle distance, an inter-vehicle time, a speed limit, and other parameters.

Next, a description is given of an example of a configuration of the conveyance amount controlling apparatus 1 according to the first implementation. The conveyance amount controlling apparatus 1 includes the control state detector 12, a road surface state detector, and at least one conveyance amount controller. The road surface state detector detects the state of the road surface on which the vehicle travels. The at least one conveyance amount controller controls an amount of information, representing the state of the road surface, to be conveyed to the driver, and includes a conveyance device and a conveyance amount controlling device. The conveyance device conveys, to the driver, the information representing the state of the road surface. The conveyance amount controlling device controls, as the amount of information to be conveyed to the driver, a vibration conveyance amount on the basis of a result of the detection performed by the control state detector 12 and a result of the detection performed by the road surface state detector. The vibration conveyance amount is an amount of conveyance of a vibration caused by an irregularity of the road surface.

The road surface state detector detects a road surface state amount, when the execution of the automatic driving control is detected by the control state detector 12. The road surface state amount has a correspondence relationship with the irregularity of the road surface. In an example implementation, the road surface state amount may be defined on the basis of a size of a plurality of convexes and a size of a plurality of concaves in a predetermined region of the road surface, and may be a value that represents roughness of the road surface. For example, the road surface state amount may be an average of a height of the plurality of convexes and a depth of the plurality of concaves both relative to a reference plane of the road surface. The road surface state detector may or may not detect the road surface state amount when the automatic driving control is not in execution.

In an example implementation, the road surface state detector may also detect a local road surface state amount, when the execution of the automatic driving control is detected by the control state detector 12. The local road surface state amount may have a correspondence relationship with a size of a single convex, a single concave, or a single difference in level, of the road surface. For example, the local road surface state amount may be the size of the convex itself, the size of the concave itself, or the size of the level difference itself. The road surface state detector may or may not detect the local road surface state amount when the automatic driving control is not in execution.

In an example implementation, the road surface state detector may be the external environment recognizer 21. The external environment recognizer 21 may recognize the irregularity of the road surface on which the vehicle travels, on the basis of the image captured by the camera device 22. Further, the external environment recognizer 21 may detect the road surface state amount and the local road surface state amount, on the basis of a result of the thus-performed recognition.

Besides the external environment recognizer 21, the conveyance amount controlling apparatus 1 in an example implementation may further include, as the road surface state detector, a road surface state detecting unit. The road surface state detecting unit may include a wireless communicator that receives information on the irregularity of the road surface through the wireless communication, and a position detector that identifies the position of the vehicle on the basis of map information. In such an example implementation, the wireless communicator may be the vehicle-to-vehicle communicator 41 or the road-to-vehicle communicator 42. The position detector may be the navigation device 31 in such an example implementation.

The road surface state detecting unit may check the information on the irregularity of the road surface received by the vehicle-to-vehicle communicator 41 or the road-to-vehicle communicator 42 and the information on the position of the vehicle identified by the navigation device 31 against each other to recognize the irregularity of the road surface on which the vehicle travels. Further, the road surface state detecting unit may detect the road surface state amount and the local road surface state amount on the basis of a result of the thus-performed recognition of the irregularity. The checking of the pieces of information may be performed by the navigation device 31, the traveling controller 10, or any other device. In an example implementation, a communicator may be used, instead of the vehicle-to-vehicle communicator 41 and the road-to-vehicle communicator 42, that receives the information on the irregularity of the road surface from a server through a mobile phone channel.

In an example implementation where the conveyance amount controlling apparatus 1 includes, as the road surface state detector, the external environment recognizer 21 and the road surface state detecting unit, the plurality of road surface state amounts may possibly be obtained together. In a case where the plurality of road surface state amounts are obtained together, in an example implementation, the conveyance amount controlling device may select, from the plurality of road surface state amounts, a road surface state amount that is the largest in value between the plurality of road surface state amounts, and may control the vibration conveyance amount on the basis of the thus-selected road surface state amount.

Similarly, in an example implementation where the conveyance amount controlling apparatus 1 includes, as the road surface state detector, the external environment recognizer 21 and the road surface state detecting unit, the plurality of local road surface state amounts may possibly be obtained together. In a case where the plurality of local road surface state amounts are obtained together, in an example implementation, the conveyance amount controlling device may select, from the plurality of local road surface state amounts, a local road surface state amount that is the largest in value between the plurality of local road surface state amounts, and may control the vibration conveyance amount on the basis of the thus-selected local road surface state amount.

In the following, a description is given in detail of the conveyance amount controller with reference to FIG. 2 and FIG. 3. In an example implementation, the at least one conveyance amount controller may be a first conveyance amount controller and a second conveyance amount controller. FIG. 2 illustrates an example of the first conveyance amount controller. FIG. 3 illustrates an example of the second conveyance amount controller.

Referring to FIG. 2, in an example implementation, the conveyance device of the first conveyance amount controller may be the suspension 50 that couples a wheel 90 and a vehicle body 100 to each other. The suspension 50 may mitigate the vibration caused by a factor of a road surface 110, such as an irregularity 111 or a level difference 112. The suspension 50 may include the shock absorber 52 illustrated in FIG. 1 and an unillustrated spring.

Referring to FIG. 3, in an example implementation, the conveyance device of the second conveyance amount controller may be the steering system 60 that couples two steered wheels 91 and 92 and the steering wheel 101 to each other. The EPS motor 62 may be provided in the steering system 60.

In the first implementation, the information representing the state of the road surface 110 is directed to the vibration caused by the irregularity 111, the level difference 112, and/or any other factor of the road surface 110. For example, in an example implementation, the suspension 50 may be a variable suspension that is able to control the vibration absorbing characteristic of the suspension 50 by controlling a property of a component of the suspension 50. In the following, a description is given of the first implementation by referring to an example in which the vibration absorbing characteristic of the suspension 50 is controlled by the shock absorber 52. In one implementation, the shock absorber 52 may serve as the "conveyance amount controlling device" that controls the vibration conveyance amount. For example, in an example implementation, the shock absorber 52 may be a variable shock absorber that is able to vary its damping force. The shock absorber 52 may control the vibration absorbing characteristic of the suspension 50 by varying the damping force, and may thereby control the vibration conveyance amount to be conveyed from the wheel 90 to the vehicle body 100. The damping force of the shock absorber 52 may be controlled by the suspension controller 51 illustrated in FIG. 1. In such an example implementation, the shock absorber 52 may control the vibration conveyance amount in accordance with a control performed by the suspension controller 51. In one implementation, the shock absorber 52 may serve as a "vibration absorbing characteristic controller" that controls the vibration absorbing characteristic of the suspension 50. In one implementation, the shock absorber 52 may serve as the "conveyance amount controlling device" of the first conveyance amount controller.

In an example implementation, the EPS motor 62 may also serve as the conveyance amount controlling device that controls the vibration conveyance amount. For example, on the basis of a vibration of the steering wheel 101 detected by the steering angle sensor 63 illustrated in FIG. 1, the EPS motor 62 may so drive the steering wheel 101 as to cancel out the vibration of the steering wheel 101. By driving the steering wheel 101 in this way, the EPS motor 62 may control the vibration conveyance amount to be conveyed from the steered wheels 91 and 92 to the steering wheel 101. The EPS motor 62 may be controlled by the steering controller 61. In such an example implementation, the EPS motor 62 may control the vibration conveyance amount in accordance with a control performed by the steering controller 61. In one implementation, the EPS motor 62 may serve as the "conveyance amount controlling device" of the second conveyance amount controller.

The conveyance amount controlling apparatus 1 may further include a comparing unit 13 and a deciding unit 14. The comparing unit 13 may compare the road surface state amount and the local road surface state amount with their predetermined thresholds. The deciding unit 14 may decide the vibration conveyance amount. In an example implementation, the traveling controller 10 may include the comparing unit 13 and the deciding unit 14 as illustrated in FIG. 1. The shock absorber 52 and the EPS motor 62 each may control the vibration conveyance amount in accordance with the decision of the deciding unit 14.

It is to be noted that the configuration of the conveyance amount controller is not limited to an example implementation illustrated in FIG. 2 and FIG. 3. For example, in one implementation, the spring of the suspension 50 may serve as the "vibration absorbing characteristic controller" and the "conveyance amount controlling device". In such an example implementation, the vibration absorbing characteristic of the suspension 50 may be controlled by adjusting a factor of the spring, such as a spring constant, to thereby control the vibration conveyance amount. Further, in such an example implementation, the spring may be an air spring that controls the spring constant by means of an air pressure.

Figure 4:
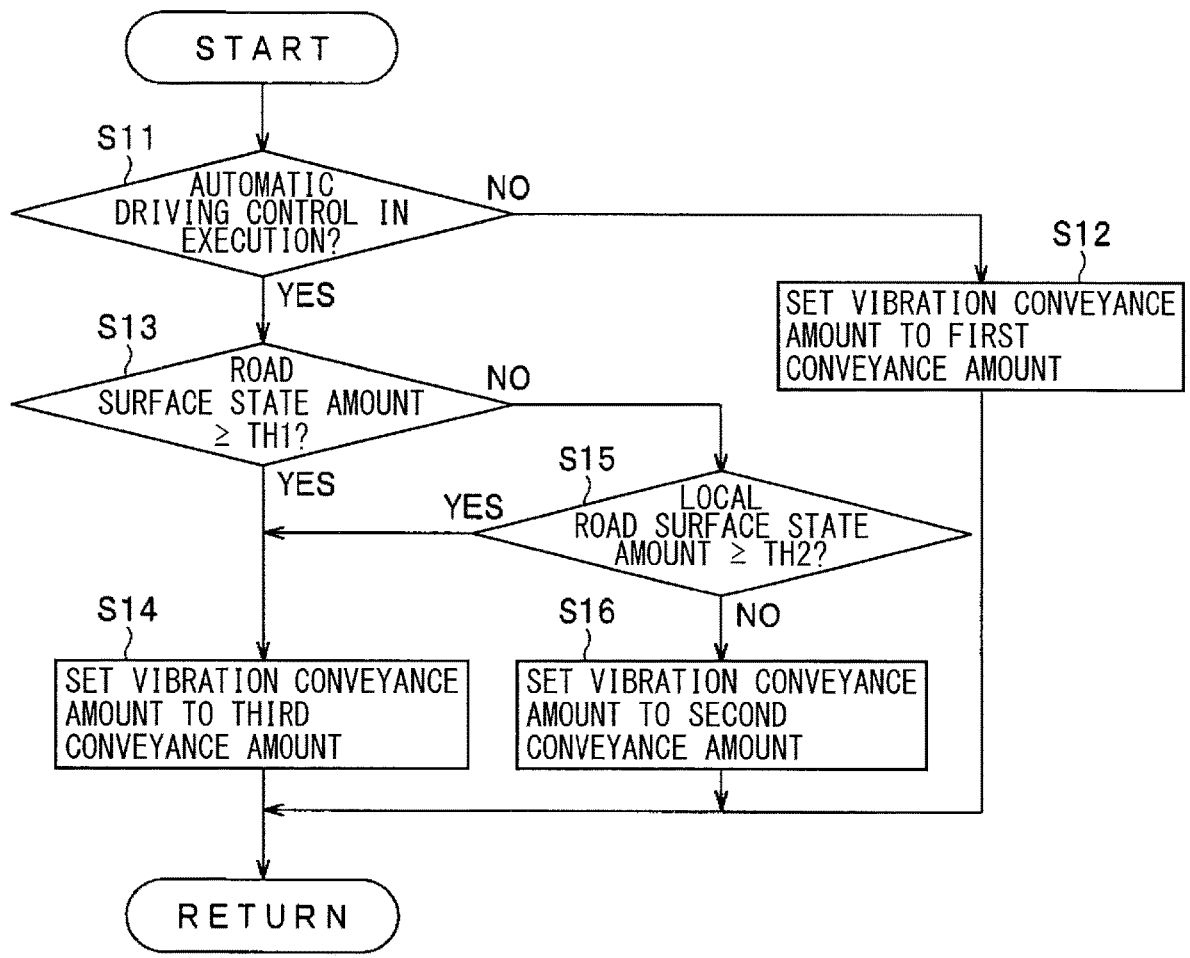
FIG. 4 is a flowchart illustrating an example of a method of deciding a first conveyance amount, a second conveyance amount, and a third conveyance amount according to one implementation of the technology.

A description is given next, with reference to FIG. 1 and FIG. 4, of an example of a procedure for deciding the vibration conveyance amount. The procedure for deciding the vibration conveyance amount may be executed at every predetermined cycle. In the example procedure illustrated in FIG. 4, first, the control state detector 12 may determine the state of the execution of the automatic driving control in step S11. When the control state detector 12 determines that the automatic driving control is not in execution (step S11: NO), the deciding unit 14 may set the vibration conveyance amount to a first conveyance amount in step S12.

When the control state detector 12 determines that the automatic driving control is in execution in step S11 (step S11: YES), the comparing unit 13 may thereafter compare the road surface state amount with a first threshold TH1 in step S13. In an example implementation, the first threshold TH1 may be a value that represents roughness of the road surface 110. When the road surface state amount is equal to or greater than the first threshold TH1 (step S13: YES), i.e., when the roughness of the road surface 110 is relatively large, the deciding unit 14 may set the vibration conveyance amount to a third conveyance amount in step S14.

When the road surface state amount is less than the first threshold TH1 in step S13 (step S13: NO), i.e., when the roughness of the road surface 110 is relatively small, the comparing unit 13 may thereafter compare the local road surface state amount with a second threshold TH2 in step S15. In an example implementation, the second threshold TH2 may be a value that represents a size of a single convex, a single concave, or a single level difference, of the road surface 110. Hereinafter, the single convex, the single concave, and the single level difference are collectively referred to as a "discontinuous portion". When the local road surface state amount is equal to or greater than the second threshold TH2 (step S15: YES), i.e., when the relatively-large discontinuous portion is detected, the deciding unit 14 may set the vibration conveyance amount to the third conveyance amount in step S14.

When the local road surface state amount is less than the second threshold TH2 in step S15 (step S15: NO), i.e., when the relatively-small discontinuous portion is detected or when the discontinuous portion is not detected, the deciding unit 14 may set the vibration conveyance amount to a second conveyance amount in step S16.

The first conveyance amount, the second conveyance amount, and the third conveyance amount may be defined as follows. The first conveyance amount may be the vibration conveyance amount directed to a case where the execution of the automatic driving control is not detected. The second conveyance amount and the third conveyance amount each may be the vibration conveyance amount directed to a case where the execution of the automatic driving control is detected. The second conveyance amount may be the vibration conveyance amount directed to a case where: the road surface state amount that is less than the first threshold TH1 is detected; and the local road surface state amount that is less than the second threshold TH2 is detected. The third conveyance amount may be the vibration conveyance amount directed to a case where the road surface state amount that is equal to or greater than the first threshold TH1 is detected, or a case where the local road surface state amount that is equal to or greater than the second threshold TH2 is detected.

In the first implementation, the second conveyance amount is made less than the first conveyance amount. Thus, when the roughness of the road surface 110 is relatively small upon the execution of the automatic driving control, the vibration conveyance amount is made less than that of a case where the automatic driving control is not in execution to thereby allow a vibration to be felt by the driver to be smaller.

Further, in the first implementation, the third conveyance amount is made greater than the second conveyance amount. Thus, when the roughness of the road surface 110 is relatively large upon the execution of the automatic driving control, the vibration conveyance amount is made greater than that of a case where the roughness of the road surface 110 is relatively small to thereby allow the vibration to be felt by the driver to be larger.

It is to be noted that the third conveyance amount may be less than the first conveyance amount, or may be equal to the first conveyance amount. Thus, when the roughness of the road surface 110 is relatively large, the vibration conveyance amount may be made less than that of a case where the automatic driving control is not in execution, or may be made equal to the vibration conveyance amount of a case where the automatic driving control is not in execution.

Moreover, in an example implementation, the vibration conveyance amount of a case, where the local road surface state amount that is equal to or greater than the second threshold TH2 is detected, may be set to the third conveyance amount. Thus, when the relatively-large discontinuous portion is detected upon the execution of the automatic driving control, the vibration conveyance amount may be increased even in a case where the roughness of the road surface 110 is relatively small to thereby allow the vibration to be felt by the driver to be larger. It is to be noted that, in an example implementation, the vibration conveyance amount may still be set to the third conveyance amount in a case where: the road surface state amount that is equal to or greater than the first threshold TH1 is detected; and the local road surface state amount that is equal to or greater than the second threshold TH2 is detected.

For description purpose, reference is made to an example in which the first conveyance amount is defined as 1 (one), where "1" is a reference value with any unit. To explicitly achieve comfort owing to the reduction in the vibration to be felt by the driver, the second conveyance amount may be made small to some extent. In an example implementation, the second conveyance amount may be equal to or less than 0.5. On the other hand, the driver may possibly experience a feeling of strangeness or fear if the vibration to be felt by the driver is eliminated completely. From this perspective, the second conveyance amount may be made larger to some extent than 0 (zero). In an example implementation, the second conveyance amount may be equal to or greater than 0.2. For some example reasons discussed above, the second conveyance amount in an example implementation may be in a range from 0.2 to 0.5.

Further, in a case where the roughness of the road surface 110 is relatively large, or in a case where the relatively-large discontinuous portion is detected, the third conveyance amount may be made larger to some extent to allow for understanding of a state of the road surface 110 while achieving the comfort owing to the reduction in the vibration to be felt by the driver. In an example implementation, the third conveyance amount may be equal to or greater than 0.7. On the other hand, even in those cases described above, the third conveyance amount does not necessarily have to be made larger than the vibration conveyance amount of a case where the automatic driving is not in execution, i.e., the first conveyance amount. For some example reasons discussed above, the third conveyance amount in an example implementation may be in a range from 0.7 to 1.

Figure 5:
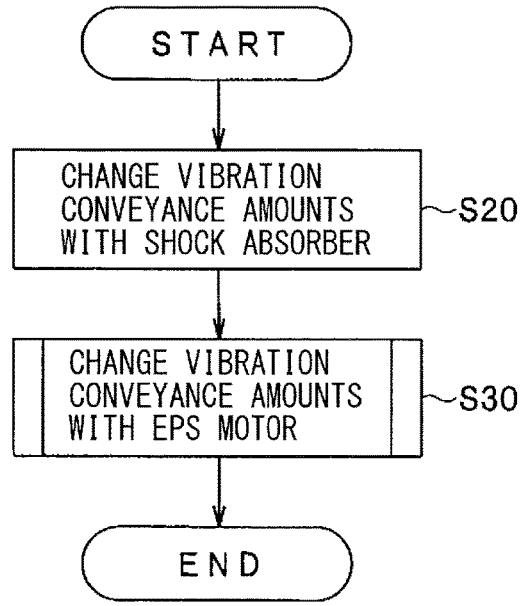
FIG. 5 is a flowchart illustrating an example of an order of changing vibration conveyance amounts by means of a vibration absorbing characteristic controller and vibration conveyance amounts by means of an electric power steering motor according to one implementation of the technology.
Figure 6:
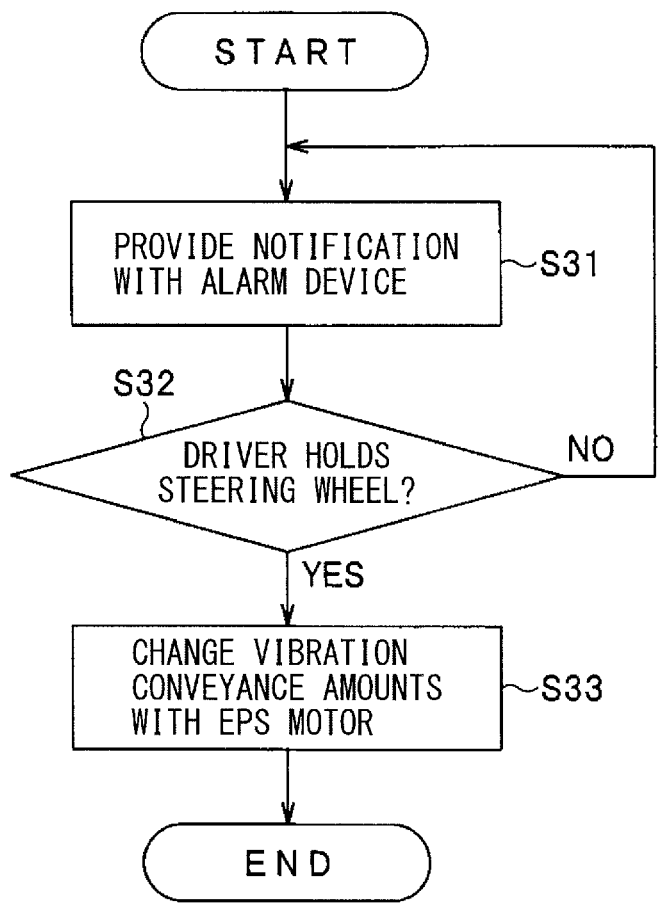
FIG. 6 is a flowchart illustrating an example of a procedure for changing the vibration conveyance amounts by means of the electric power steering motor according to one implementation of the technology.

A description is given next of an example of a procedure for changing the vibration conveyance amounts with reference to FIG. 5 and FIG. 6. One procedure for changing the vibration conveyance amounts is described here by referring to an example in which the vibration conveyance amount is to be changed from the second conveyance amount to the third conveyance amount. The change in the vibration conveyance amount may be performed when the value of the road surface state amount is changed from a value that is less than the first threshold TH1 to a value that is equal to or greater than the first threshold TH1. The change in the vibration conveyance amount may also be performed when, where the value of the road surface state amount is less than the first threshold TH1, the value of the local road surface state amount is changed from a value that is less than the second threshold TH2 to a value that is equal to or greater than the second threshold TH2. Referring to FIG. 5, when changing the vibration conveyance amounts, first, the vibration absorbing characteristic controller of the suspension 50, e.g., the shock absorber 52, may change the vibration conveyance amounts in step S20. Thereafter, the EPS motor 62 may change the vibration conveyance amounts in step S30.

Further, in an example implementation, the EPS motor 62 may change the vibration conveyance amounts in accordance with an example procedure illustrated in FIG. 6. In an example procedure illustrated in FIG. 6, first, the alarm device 43 may give a predetermined warning to the driver in step S31. Non-limiting examples of the predetermined warning may include: a warning notifying that the road surface state amount equal to or greater than the first threshold TH1 is detected, or that the local road surface state amount equal to or greater than the second threshold TH2 is detected; a warning notifying that the state of the road surface 110 may possibly deteriorate; and a warning prompting the driver to discontinue the automatic driving control and drive manually.

Thereafter, a grip detector may determine whether the driver holds the steering wheel 101 in step S32. In one implementation, the steering torque sensor 64 illustrated in FIG. 1 may serve as the "grip detector". When the grip detector does not detect that the driver holds the steering wheel 101 (step S32: NO), the process may return to step S31 to give a warning to the driver by the alarm device 43 again. In this case, the alarm device 43 may give, to the driver, a warning instructing the driver to hold the steering wheel 101.

When the grip detector detects that the driver holds the steering wheel 101 in step S32 (step S32: YES), the EPS motor 62 may change the vibration conveyance amounts in step S33. This may complete the changing of the vibration conveyance amounts.

A procedure for changing the vibration conveyance amounts of any case, other than the case in which the vibration conveyance amount is to be changed from the second conveyance amount to the third conveyance amount, may be the same as the example procedure described above with reference to FIG. 5 and FIG. 6. In an example implementation, the shock absorber 52 and the EPS motor 62 may change the vibration conveyance amounts substantially at the same time.

A description is given next of examples of workings and effects of the conveyance amount controlling apparatus 1 according to the first implementation. As described above, the first implementation causes the second conveyance amount to be less than the first conveyance amount. Thus, when the roughness of the road surface 110 is relatively small upon the execution of the automatic driving control, the vibration conveyance amount is made less than that of a case where the automatic driving control is not in execution to thereby allow the vibration to be felt by the driver to be smaller. Hence, according to the first implementation, it is possible to improve comfort during the execution of the automatic driving control.

Further, the first implementation causes the third conveyance amount to be greater than the second conveyance amount as described above. Thus, when the roughness of the road surface 110 is relatively large upon the execution of the automatic driving control, the vibration conveyance amount is made greater than that of a case where the roughness of the road surface 110 is relatively small to thereby allow the vibration to be felt by the driver to be larger. Accordingly, the first implementation makes it possible to direct the driver's attention to the state of the road surface 110. Hence, according to the first implementation, it is possible to prompt the driver to take safety action, such as discontinuing the automatic driving. Further, according to the first implementation, it is possible to prevent the driver from missing the deterioration in the state of the road surface 110, and to prevent the delay in determining the discontinuation of the automatic driving resulting from the deterioration in the state of the road surface 110.

For some reasons discussed above, it is possible for the first implementation to achieve a balance between the comfort and the safety.

In addition, an example implementation may set the vibration conveyance amount of a case, where the local road surface state amount that is equal to or greater than the second threshold TH2 is detected, to the third conveyance amount as described above. Thus, when the relatively-large discontinuous portion is detected upon the execution of the automatic driving control, the vibration conveyance amount is increased even in a case where the roughness of the road surface 110 is relatively small to thereby allow the vibration to be felt by the driver to be larger. Hence, according to an example implementation, it is possible to further improve the safety.

Further, an example implementation may use, as the road surface state detector, the external environment recognizer 21 that uses the camera device 22. This detects the state of the road surface 110 ahead of the vehicle, making it possible to change the vibration conveyance amounts before the state of the road surface 110 actually deteriorates. Hence, according to an example implementation, it is possible to further improve the safety. Example effects owing to the use of the external environment recognizer 21 for the road surface state detector apply to any implementation in which the road surface state detecting unit is used that includes the wireless communicator and the position detector.

It is to be noted that the vibration of the steering wheel 101 may possibly increase when the EPS motor 62 changes the vibration conveyance amounts from the second conveyance amount to the third conveyance amount. In this case, the driver may possibly experience a feeling of strangeness if the vibration of the steering wheel 101 increases suddenly. In contrast, according to an example implementation, a timing at which the EPS motor 62 changes the vibration conveyance amounts may be after a timing at which the shock absorber 52 changes the vibration conveyance amounts. Hence, according to an example implementation, it is possible to reduce the feeling of strangeness which the driver may possibly experience.

In addition, in an example implementation, the EPS motor 62 may change the vibration conveyance amounts after the alarm device 43 has issued the predetermined warning. Hence, in this way, it is also possible for an example implementation to reduce the feeling of strangeness which the driver may possibly experience.

Moreover, in an example implementation, the EPS motor 62 may change the vibance conveyance amounts after the steering wheel 101 has been detected as being held by the driver. Hence, in this way, it is also possible for an example implementation to reduce the feeling of strangeness which the driver may possibly experience.

Second Implementation

Figure 7:
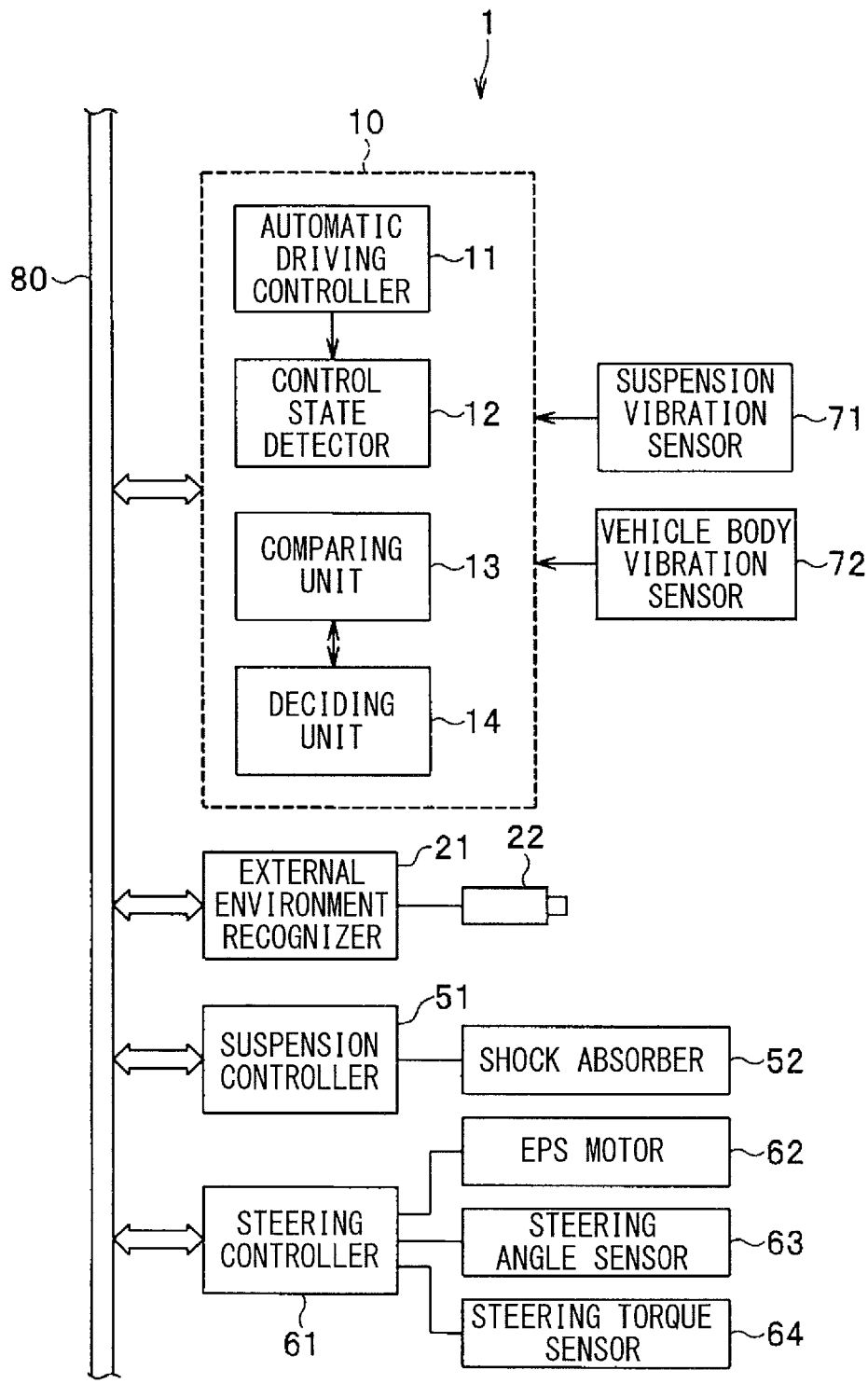
FIG. 7 illustrates an example of a configuration of a traveling control system that includes the conveyance amount controlling apparatus according to one implementation of the technology.

Next, a description is given of a second implementation of the technology with reference to FIG. 7. FIG. 7 illustrates an example of a configuration of a traveling control system that includes a conveyance amount controlling apparatus 1 according to the second implementation. Note that the illustrations of the navigation device 31, the vehicle-to-vehicle communicator 41, the road-to-vehicle communicator 42, and the alarm device 43 described in the first implementation are omitted in FIG. 7.

The conveyance amount controlling apparatus 1 according to the second implementation may differ from that according to the first implementation in the following respects. The conveyance amount controlling apparatus 1 according to the second implementation may include the plurality of road surface state detectors. One of the plurality of road surface state detectors may be the external environment recognizer 21. In addition to the external environment recognizer 21, the conveyance amount controlling apparatus 1 may further include, as the plurality of road surface state detectors, a suspension vibration sensor 71 provided for the suspension 50 illustrated in FIG. 2, a vehicle body vibration sensor 72 provided for the vehicle body 100 illustrated in FIG. 2, and the steering angle sensor 63.

Further, the following first to fourth road surface state amounts may be detected as the road surface state amount in the second implementation. The first road surface state amount may be the same as the road surface state amount described in the first implementation. The second road surface state amount may be amplitude of a vibration of the suspension 50. The third road surface state amount may be amplitude of a vibration of the vehicle body 100 of the vehicle. The fourth road surface state amount may be amplitude of a vibration of the steering wheel 101.

The amplitude of the vibration of the suspension 50, the amplitude of the vibration of the vehicle body 100 of the vehicle, and the amplitude of the vibration of the steering wheel 101 each may vary depending on the size of the irregularity of the road surface. In other words, the second road surface state amount, the third road surface state amount, and the fourth road surface state amount each may have a correspondence relationship with the irregularity of the road surface.

The second road surface state amount may be detected by the suspension vibration sensor 71. The third road surface state amount may be detected by the vehicle body vibration sensor 72. The suspension vibration sensor 71 and the vehicle body vibration sensor 72 may be coupled to the traveling controller 10 as illustrated in FIG. 7. The fourth road surface state amount may be detected by the steering angle sensor 63. The steering angle sensor 63 may be coupled to the steering controller 61.

Further, the following first to fourth local road surface state amounts may be detected as the local road surface state amount in the second implementation. The first local road surface state amount may be the same as the local road surface state amount described in the first implementation. The second local road surface state amount may be the amplitude per vibration of the suspension 50. The third local road surface state amount may be the amplitude per vibration of the vehicle body 100 of the vehicle. The fourth local road surface state amount may be the amplitude per vibration of the steering wheel 101. A method of detecting the second local road surface state amount, the third local road surface state amount, and the fourth local road surface state amount may be similar to the example method of detecting the second road surface state amount, the third road surface state amount, and the fourth road surface state amount.

In the second implementation, the shock absorber 52 and the EPS motor 62 serving as the conveyance amount controlling devices each may select, from the first to the fourth road surface state amounts, a road surface state amount that is the largest in value between the first to the fourth road surface state amounts, and may control the vibration conveyance amount on the basis of the thus-selected road surface state amount. Similarly, the shock absorber 52 and the EPS motor 62 each may select, from the first to the fourth local road surface state amounts, a local road surface state amount that is the largest in value between the first to the fourth local road surface state amounts, and may control the vibration conveyance amount on the basis of the thus-selected local road surface state amount. A method of deciding the vibration conveyance amount may be similar to the example method of deciding the vibration conveyance amount described with reference to FIG. 4 in the first implementation.

The second implementation may include the plurality of road surface state detectors as described above. Thus, even when one of the plurality of road surface state detectors fails to sufficiently recognize the irregularity of the road surface, it is possible to recognize the irregularity of the road surface by any other one of the plurality of road surface state detectors. Hence, according to the second implementation, it is possible to further improve the safety.

As an example implementation, the conveyance amount controlling apparatus 1 according to the second implementation may include, as one of the plurality of road surface state detectors, the road surface state detecting unit described in the first implementation which includes the wireless communicator and the position detector.

Other configurations, workings, and effects according to the second implementation are similar to those according to the first implementation.

Third Implementation

Figure 8:
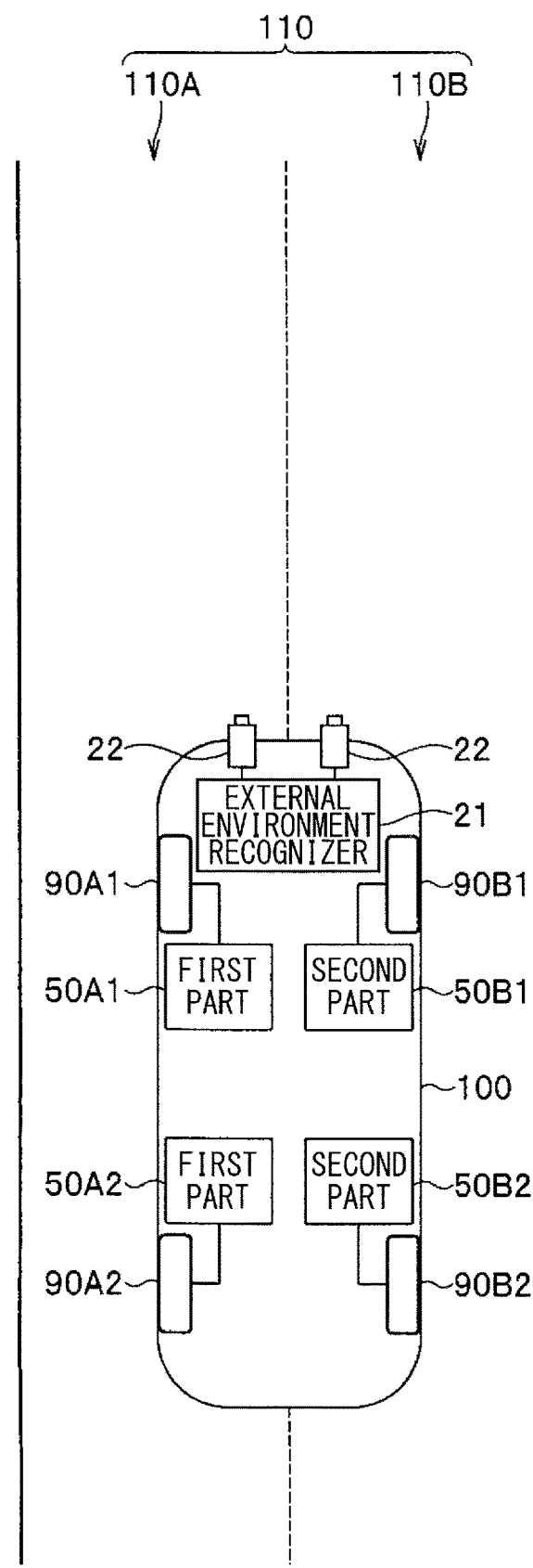
FIG. 8 illustrates an example of a first state amount and a second state amount according to one implementation of the technology.

Next, a description is given of a third implementation of the technology. The conveyance amount controlling apparatus 1 according to the third implementation may differ from that according to the first implementation in the following respects. In the third implementation, a first state amount and a second state amount may be detected as the road surface state amount. FIG. 8 illustrates an example of the first state amount and the second state amount. Referring to FIG. 8, the road surface 110 may be regarded as being divided into a first road surface region 110A and a second road surface region 110B. The first road surface region 110A may be a region through which two first wheels 90A1 and 90A2 pass. The first wheels 90A1 and 90A2 may be provided on one side (e.g., on the left side in FIG. 8) in a width direction of the vehicle body 100. The second road surface region 110B may be a region through which two second wheels 90B1 and 90B2 pass. The second wheels 90B1 and 90B2 may be provided on the opposite side (e.g., on the right side in FIG. 8) of the first wheels 90A1 and 90A2 in the width direction.

The first state amount may be the road surface state amount that has a correspondence relationship with the irregularity of the first road surface region 110A. The second state amount may be the road surface state amount that has a correspondence relationship with the irregularity of the second road surface region 110B. In the third implementation, the first state amount and the second state amount may be detected by the external environment recognizer 21.

Further, in the third implementation, a first local state amount and a second local state amount may be detected as the local road surface state amount. The first local state amount may be the local road surface state amount that has a correspondence relationship with the size of the single convex, the single concave, or the single level difference, of the first road surface region 110A. The second local state amount may be the local road surface state amount that has a correspondence relationship with the size of the single convex, the single concave, or the single level difference, of the second road surface region 110B. In the third implementation, the first local state amount and the second local state amount may be detected by the external environment recognizer 21.

The suspension 50 according to the third implementation may include a first part 50A1, a first part 50A2, a second part 50B1, and a second part 50B2. The first part 50A1 may couple the first wheel 90A1 and the vehicle body 100 to each other. The first part 50A2 may couple the first wheel 90A2 and the vehicle body 100 to each other. The second part 50B1 may couple the second wheel 90B1 and the vehicle body 100 to each other. The second part 50B2 may couple the second wheel 90B2 and the vehicle body 100 to each other. The first parts 50A1 and 50A2 and the second parts 50B1 and 50B2 each may include the spring and the shock absorber 52 illustrated in FIG. 2.

The shock absorber 52 of the first part 50A1 may control the vibration absorbing characteristic of the first part 50A1. In one implementation, the shock absorber 52 of the first part 50A1 may serve as a "first controller". For example, the shock absorber 52 of the first part 50A1 may vary its damping force to control the vibration absorbing characteristic of the first part 50A1, and may thereby control the vibration conveyance amount to be conveyed from the first wheel 90A1 to the vehicle body 100.

The shock absorber 52 of the first part 50A2 may control the vibration absorbing characteristic of the first part 50A2. In one implementation, the shock absorber 52 of the first part 50A2 may serve as the "first controller". For example, the shock absorber 52 of the first part 50A2 may vary its damping force to control the vibration absorbing characteristic of the first part 50A2, and may thereby control the vibration conveyance amount to be conveyed from the first wheel 90A2 to the vehicle body 100.

The shock absorber 52 of the second part 50B1 may control the vibration absorbing characteristic of the second part 50B1. In one implementation, the shock absorber 52 of the second part 50B1 may serve as a "second controller". For example, the shock absorber 52 of the second part 50B1 may vary its damping force to control the vibration absorbing characteristic of the second part 50B1, and may thereby control the vibration conveyance amount to be conveyed from the second wheel 90B1 to the vehicle body 100.

The shock absorber 52 of the second part 50B2 may control the vibration absorbing characteristic of the second part 50B2. In one implementation, the shock absorber 52 of the second part 50B2 may serve as the "second controller". For example, the shock absorber 52 of the second part 50B2 may vary its damping force to control the vibration absorbing characteristic of the second part 50B2, and may thereby control the vibration conveyance amount to be conveyed from the second wheel 90B2 to the vehicle body 100.

The vibration conveyance amounts of the first parts 50A1 and 50A2, hereinafter referred to as a first vibration conveyance amount, may be decided on the basis of the first state amount and the first local state amount. The vibration conveyance amounts of the second parts 50B1 and 50B2, hereinafter referred to as a second vibration conveyance amount, may be decided on the basis of the second state amount and the second local state amount. A method of deciding the first vibration conveyance amount and a method of deciding the second vibration conveyance amount each may be similar to the example method of deciding the vibration conveyance amount described with reference to FIG. 4 in the first implementation.

According to the third implementation, the first vibration conveyance amount and the second vibration conveyance amount may be decided separately between the both sides in the width direction of the vehicle body 100 as described above. The first vibration conveyance amount and the second vibration conveyance amount may sometimes differ from each other when the first state amount and the second state amount differ from each other. For example, in a case where one of the first and the second state amounts is less than the first threshold TH1 and the other of the first and the second state amounts is equal to or greater than the first threshold TH1, one of the first and the second vibration conveyance amounts may be set to the second conveyance amount, and the other of the first and the second vibration conveyance amounts may be set to the third conveyance amount. Hence, according to the third implementation, it is possible to recognize which of the first road surface region 110A and the second road surface region 110B involves the deterioration in the state of the road surface.

It is to be noted that, in a case where one of the first and the second vibration conveyance amounts is set to the second conveyance amount and the other of the first and the second vibration conveyance amounts is set to the third conveyance amount, a large difference between the second conveyance amount and the third conveyance amount may possibly affect a behavior or the vehicle body 100 of the vehicle. In such a case, as an example implementation, one or both of the second conveyance amount and the third conveyance amount may be varied to allow the difference between the second conveyance amount and the third conveyance amount to be smaller.

As an example implementation, the conveyance amount controlling apparatus 1 according to the third implementation may include the plurality of road surface state detectors as with the second implementation. In such an example implementation, the plurality of road surface state detectors each may detect the first and the second state amounts and the first and the second local state amounts. Further, in such an example implementation, the conveyance amount controlling apparatus 1 may include, as one of the plurality of road surface state detectors, the road surface state detecting unit described in the first implementation which includes the wireless communicator and the position detector.

Other configurations, workings, and effects according to the third implementation are similar to those according to the first implementation or the second implementation.

Although some implementations of the technology have been described in the foregoing with reference to the accompanying drawings, the technology is by no means limited to the implementations described above. Various changes and modifications may be made to any implementation without departing from the scope of the technology. For example, the third conveyance amount may be made even larger in a case where: the road surface state amount that is equal to or greater than the first threshold TH1 is detected; and the local road surface state amount that is equal to or greater than the second threshold TH2 is detected.

The traveling controller 10 illustrated in FIGS. 1 and 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling controller 10 illustrated in FIGS. 1 and 7.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A conveyance amount controlling apparatus for a vehicle comprising:
   a control state detector comprising a first processor configured to detect that the vehicle is under automatic driving control, the automatic driving control controlling the vehicle to travel automatically along a target course;
   a road surface state detector configured to:
      detect a road surface state amount on a basis of heights of convexes and depths of concaves of a road surface along the target course when the vehicle is under the automatic driving control, the road surface state amount representing roughness of the road surface, wherein the height of convexes and the depth of concaves are detected by using a camera or a radar, and
      detect a local road surface state amount different from the road surface state amount on a basis of a size of a single convex, a single concave or a single bump of the road surface when the vehicle is under the automatic driving control, wherein a size of the single convex, the single concave or the single bump on the road surface along the target course are detected by using the camera or the radar; and
   a second processor configured to change vibration, caused by the convexes and the concaves of the road surface and transmitted from wheels to a vehicle body of the vehicle, in response to the road surface state amount and the local road surface state amount,
   the second processor configured to:
      suppress the vibration to a first conveyance amount when the vehicle is driven manually without the automatic driving control, and
      suppress the vibration to a second conveyance amount that is less than the first conveyance amount, when the road surface state amount is less than a first threshold and the local road surface state amount is less than a second threshold and the vehicle is under the automatic driving control,
      wherein the second processor is configured to increase the vibration to and maintain the vibration at a third conveyance amount that is more than the second conveyance amount and that is equal to or less than the first conveyance amount, while under the automatic driving control
         when the road surface state amount is equal to or more than the first threshold, and
         when the road surface state amount is less than the first threshold and the local road surface state amount is equal to or more than the second threshold.

2. The conveyance amount controlling apparatus according to claim 1, wherein the road surface state amount is defined on a basis of an average of the heights of the convexes and the depths of the concaves relative to a reference plane of the road surface in a predetermined region of the road surface.

3. The conveyance amount controlling apparatus according to claim 2, wherein
   the road surface state detector further detects, when the execution of the automatic driving control is detected by the control state detector, a local road surface state amount based on a height of one of the plurality of convexes or a depth of one of the plurality of concaves of the road surface, and
   the second processor sets a vibration conveyance amount, obtained when the local road surface state amount that is equal to or greater than a second threshold is detected, to the third conveyance amount.

4. The conveyance amount controlling apparatus according to claim 1, wherein the road surface state detector comprises an external environment recognizer that recognizes an irregularity of the road surface on a basis of an image captured by the camera device.

5. The conveyance amount controlling apparatus according to claim 1, wherein the road surface state detector further includes:
   a wireless communicator configured to receive information on the irregularity of the road surface through a wireless communication; and
   a position detector configured to identify a position of the vehicle on a basis of map information.

6. The conveyance amount controlling apparatus according to claim 1, wherein
   the road surface state detector further comprises a vibration sensor of a suspension of the vehicle configured to detect an amplitude of a vibration of the suspension.

7. The conveyance amount controlling apparatus according to claim 1, wherein
   the road surface state detector further comprises a vibration sensor on a vehicle body of the vehicle configured to detect an amplitude of a vibration of the vehicle body.

8. The conveyance amount controlling apparatus according to claim 1, wherein
the road surface state detector further comprises a steering angle sensor that detects a steering angle of a steering wheel of the vehicle configured to detect an amplitude of a vibration of the steering wheel.

9. The conveyance amount controlling apparatus according to claim 1, wherein the second processor is configured to control a suspension of the vehicle, and wherein the second processor is configured to control a vibration absorbing characteristic of the suspension.

10. The conveyance amount controlling apparatus according to claim 9, wherein
the road surface state detector detects, as the road surface state amount, a first state amount that has a correspondence relationship with an irregularity of a first region of the road surface through which a first wheel of the vehicle passes, and a second state amount that has a correspondence relationship with an irregularity of a second region of the road surface through which a second wheel of the vehicle passes, the first wheel being provided on one side in a width direction of a vehicle body of the vehicle, the second wheel being provided on opposite side of the first wheel in the width direction,
the suspension includes a first part that couples the first wheel and the vehicle body to each other, and a second part that couples the second wheel and the vehicle body to each other,
the second processor is configured to control the vibration absorbing characteristic of the first part, and control the vibration absorbing characteristic of the second part,
the second processor controls the vibration conveyance amount on a basis of the first state amount, and
the second processor controls the vibration conveyance amount on a basis of the second state amount.

11. The conveyance amount controlling apparatus according to claim 1, wherein
the second processor is configured to control a steering system of the vehicle, and
an electric power steering motor provided in the steering system.

12. The conveyance amount controlling apparatus according to claim 11, wherein the conveyance amount controlling apparatus is configured to give a predetermined warning to the driver on a basis of the result of the detection performed by the road surface state detector,
wherein the electric power steering motor changes the vibration conveyance amounts from the second conveyance amount to the third conveyance amount after the conveyance amount controlling apparatus has given the predetermined warning to the driver, on a condition that the road surface state amount is changed from a value that is less than the first threshold to a value that is equal to or greater than the first threshold.

13. The conveyance amount controlling apparatus according to claim 11, further comprising a grip detector configured to detect holding by the driver of a steering wheel of the vehicle,
wherein the electric power steering motor changes the vibration conveyance amounts from the second conveyance amount to the third conveyance amount after the grip detector has detected that the driver holds the steering wheel, on a condition that the road surface state amount is changed from a value that is less than the first threshold to a value that is equal to or greater than the first threshold.

14. The conveyance amount controlling apparatus according to claim 1, wherein
the second processor is configured to suppress, when the local road surface state amount is equal to or more than the second threshold, the vibration to the third conveyance amount.

15. The conveyance amount controlling apparatus according to claim 1, wherein
the second processor is configured to suppress the vibration by at least one of: adjusting damping force of a shock absorber installed in a suspension of the vehicle, adjusting elastomeric force of a spring installed in the suspension, or driving an electric power steering motor of the vehicle as to cancel out the vibration.

16. The conveyance amount controlling apparatus according to claim 1, wherein
the second processor is configured to suppress the vibration to the second conveyance amount that is 20% to 50% of the first conveyance amount when the road surface state amount is less than the first threshold and the local road surface state amount is less than the second threshold and the vehicle is under the automatic driving control.

17. A conveyance amount controlling apparatus for a vehicle comprising:
a memory;
circuitry coupled with the memory, the circuitry configured to:
detect that the vehicle is under automatic driving control, the automatic driving control controlling the vehicle to travel automatically along a target course,
calculate a road surface state amount on a basis of heights of convexes and depths of concaves of a road surface along the target course when the vehicle is under the automatic driving control, the road surface state amount representing roughness of the road surface, wherein the height of convexes and the depth of concaves are detected by using a camera or a radar,
calculate a local road surface state amount different from the road surface state amount on a basis of a size of a single convex, a single concave or a single bump of the road surface when the vehicle is under the automatic driving control, wherein a size of the single convex, the single concave or the single bump on the road surface along the target course are detected by using the camera or the radar,
change vibration, caused by the convexes and the concaves of the road surface and transmitted from wheels to a vehicle body of the vehicle in response to the road surface state amount and the local road surface state amount, the circuitry configured to:
suppress the vibration to a first conveyance amount when the vehicle is driven manually without the automatic driving control, and
suppress the vibration to a second conveyance amount that is less than the first conveyance amount, when the road surface state amount is less than a first threshold and the local road surface state amount is less than a second threshold and the vehicle is under the automatic driving control,
wherein the circuitry is configured to increase the vibration to and maintain the vibration at a third conveyance amount that is more than the second conveyance amount and that is equal to or less than the first conveyance amount, while under the automatic driving control:

when the road surface state amount is equal to or more than the first threshold, and when the road surface state amount is less than the first threshold and the local road surface state amount is equal to or more than the second threshold.

\* \* \* \* \*